(12) United States Patent
Mallia et al.

(10) Patent No.: US 6,250,785 B1
(45) Date of Patent: Jun. 26, 2001

(54) LIGHT TUBE RUNNING BOARD LIGHTING

(75) Inventors: Lino Mallia, Harrison Township; Donald P. Chevalier, Armada; Stuart Boynton, Grosse Pointe, all of MI (US)

(73) Assignee: Algonquin Industries International, Inc., Huntsville, Ontario (CA)

( * ) Notice: Subject to any disclaimer, the term of this patent is extended or adjusted under 35 U.S.C. 154(b) by 0 days.

(21) Appl. No.: 09/394,449

(22) Filed: Sep. 10, 1999

(51) Int. Cl.$^7$ ..................................................... B60Q 1/24
(52) U.S. Cl. ........................ 362/511; 362/495; 362/551; 362/555
(58) Field of Search ..................... 362/459, 495, 362/501, 540, 551, 555, 559, 560, 582, 545, 487, 496, 576, 581

(56) References Cited

U.S. PATENT DOCUMENTS

| | | |
|---|---|---|
| Re. 34,275 | 6/1993 | Ramsey . |
| 2,010,374 * | 8/1935 | Pissis ................................. 362/495 |
| 2,561,756 | 7/1951 | Shook . |
| 4,271,485 | 6/1981 | George, Jr. . |
| 4,463,962 | 8/1984 | Snyder . |
| 4,544,991 | 10/1985 | Gorsuch . |
| 4,557,494 | 12/1985 | Elwell . |
| 4,819,136 | 4/1989 | Ramsey . |
| 4,947,293 | 8/1990 | Johnson et al. . |
| 4,965,704 | 10/1990 | Osborne, Sr. . |
| 4,985,810 | 1/1991 | Ramsey . |
| 5,132,883 | 7/1992 | La Lumandier . |
| 5,193,829 | 3/1993 | Holloway et al. . |
| 5,257,847 | 11/1993 | Yonehara . |
| 5,450,299 | 9/1995 | Lepre . |
| 5,495,400 * | 2/1996 | Currie ................................. 362/551 |
| 5,613,762 | 3/1997 | Agabekov . |
| 5,915,830 * | 6/1999 | Dickson et al. .................... 362/495 |

* cited by examiner

*Primary Examiner*—Y. Quach
(74) *Attorney, Agent, or Firm*—Harness, Dickey & Pierce, PLC

(57) ABSTRACT

A vehicle light assembly is provided having a light source emitting light into a light pipe or tube extending along a portion of a vehicle. The light pipe casts light directly and uniformly upon a ground surface beneath a vehicle and/or a stepping surface of a running board, if such a running board is installed upon the vehicle, without directing excessive glare or light into the eyes of the user.

17 Claims, 4 Drawing Sheets

LIGHT TUBE RUNNING BOARD LIGHTING

BACKGROUND OF THE INVENTION

1. Field of the Invention

The present invention relates to lights for a vehicle and, more particularly, to a light tube assembly for directly and uniformly lighting a ground surface below a vehicle and/or a stepping surface of a running board install on the vehicle.

2. Background and Summary of the Invention

Lighting assemblies for illuminating vehicles have typically been coupled with running boards for both decorative and safety reasons. As is widely known in the art, vehicle running boards provide an intermediate step to aid in the entry or exit of a vehicle and are also used to improve the aesthetic quality of the vehicle. These running boards typically extend from the rear of the front wheel well to either the end of the front doors or to the front of the rear wheel well. An example of such a running board can be seen in U.S. Pat. No. 5,382,035.

Generally, running board lighting assemblies employ a standard incandescent bulb and lens assembly to illuminate the stepping surface of the running board. These incandescent bulb-type lighting assemblies may be disposed at various locations along the running board for improved illumination of the running board. However, it should be appreciated that multiple lighting assemblies lead to increased costs. Consequently, it is preferable to maximize the illumination characteristics of the lighting assembly, while simultaneously minimizing the number of light sources required.

Furthermore, the above method may cause glaring light to be cast upon the running board or directed into the eyes of the occupant, thereby blinding the occupant during entry and exit of the vehicle. Still further, the above method may fail to provide adequate ground lighting beneath the vehicle so as to illuminate potential trip hazards or various other safety hazards.

In an alternative design, a strip of small incandescent bulbs is disposed along the running board to cast light upon the running board stepping surface. However, this alternative design fails to provide a convenient method for replacing expired bulbs. Additionally, this method, like the previous method, may fail to provide adequate ground lighting and step lighting from a single light source to minimize costs. Moreover, this method, like the previous method, may only be used on vehicles equipped with running boards.

It is therefore desirable to provide a lighting assembly capable of lighting a stepping surface of a running board in addition to a ground surface below the running board. It is further desirable to provide a lighting assembly capable of lighting a ground surface below a vehicle which is not equipped with running boards. It is still further desirable to provide a lighting assembly capable of lighting the stepping surface of a running board or the ground surface below a vehicle while minimizing glare and stray light which may enter the eyes of the user.

According to the preferred embodiment of the present invention, a lighting assembly is provided having a light source emitting light into a light tube extending along and secured to a vehicle. This method allows the light from the light tube to be cast directly and uniformly upon the ground surface beneath the vehicle to improve safety and aesthetics. The light from the light tube may also be cast upon a running board of the vehicle, if one is so installed, without the need to modify the lighting assembly.

Further areas of applicability of the present invention will become apparent from the detailed description provided hereinafter. It should be understood however that the detailed description and specific examples, while indicating the preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
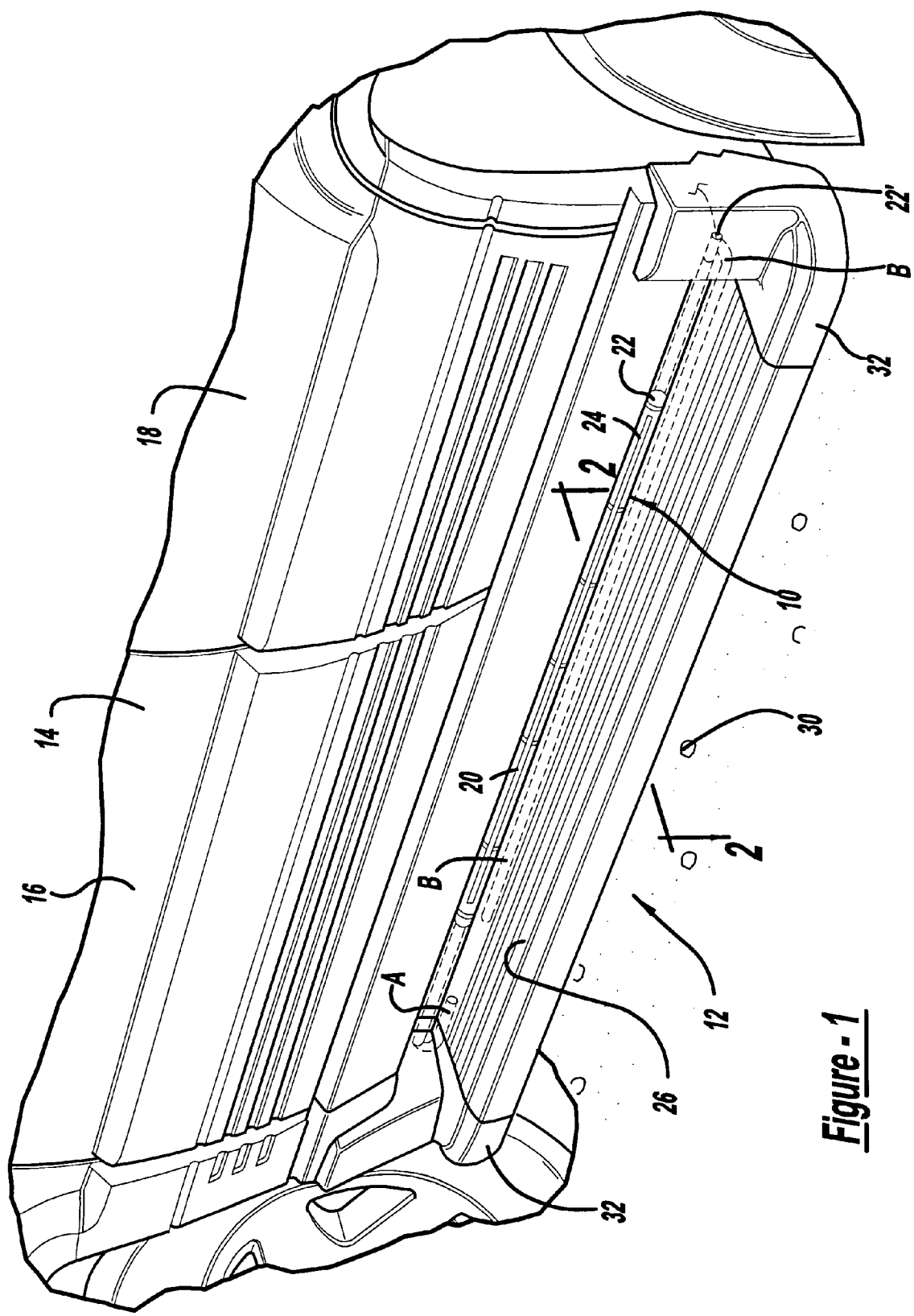
FIG. 1 is a perspective view of the lighting assembly of the present invention attached to a running board of a vehicle.

Referring to FIG. 1, a running board light assembly 10 in accordance with a first embodiment of the present invention is shown attached to a running board 12 of a vehicle 14. Running board light assembly 10 is adaptable to be attached to a variety of different vehicles including trucks and vans, among others. Running board light assembly 10 is designed to extend longitudinally from generally the front of a front door 16 to either the end of front door 16 (two-door vehicles) or the rear of a rear door 18 (four-door vehicles). It is anticipated that running board light assembly 10 can extend the entire length of running board 12 or may be coupled with other lighting assemblies for varying aesthetic effects.

Figure 2:
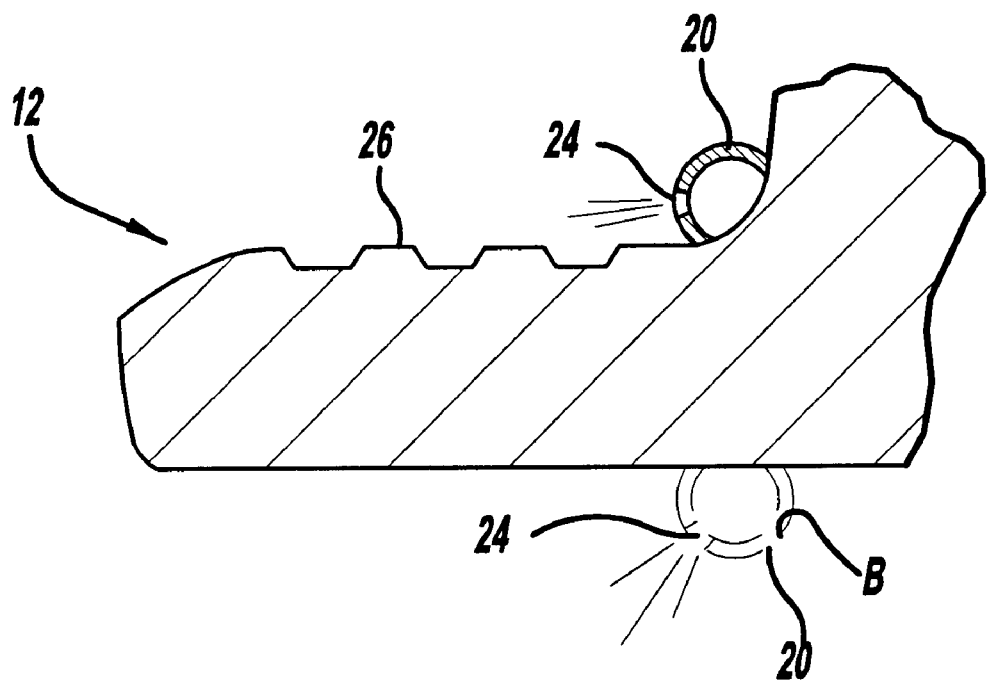
FIG. 2 is a partial cross-sectional view taken along line 2—2 of FIG. 1.

Still referring to FIG. 1, running board light assembly 10 includes a light tube or pipe 20 and a light source 22. Light tube 20 is preferably made of a hard acrylic material. However, soft acrylic and fiber-optic material have also been found to possess favorable qualities. As best seen in FIG. 2, light tube 20 includes a translucent or transparent outer portion 24 along its length. Translucent or transparent outer portion 24 allows light transmitted through light tube 20 from light source 22 to be directly and uniformly cast upon a stepping surface 26 of running board 12.

It is anticipated that running board light assembly 10 may be fastened to running board 12 after running board 12 is attached to vehicle 14. On the other hand, running board light assembly 10 may be integrated into the design and manufacture of running board 12 to provide an improved aesthetic value.

Light source 22 of running board light assembly 10 is preferably a single incandescent bulb disposed at an end of light tube 20. However, other common light sources, such as light emitting diodes (LED) or halogen bulbs, may be used. Referring to FIGS. 1 and 2, light source 22 is installed in an end of light tube 20 such that light source 22 is in communication with an interior volume 28 of light tube 20. Interior volume 28 carries the light and reflects it through translucent or transparent outer portion 24.

Using this method, various advantages are realized. First, the transmitting of light through interior volume 28 allows the light to be more efficiently directed over stepping surface 26. Therefore, only a single light source is required to illuminate an entire area of running board 12. Second, the ground 30 beneath running board 12 may be illuminated by directing an end of light tube 20 downward such that it is positioned below running board 12, as shown in phantom as Option A in FIG. 1. Similarly, light source 22 may be tapped to provide light along the ground 30 below running board 12, as shown as Option B in FIGS. 1 (hidden) and 2 (in phantom). Option B illustrates, in phantom, a light tube 20 with a transparent outer portion 24 in communication with light source 22 and positioned below running board 12. The lighting of the ground in this manner allows for improved safety and aesthetic value. Third, the use of translucent or transparent outer portion 24 minimizes glare and directs light away from the eyes of the user, thereby allowing easier entry and exit of the vehicle. Fourth, the present invention allows a light source 22' to be disposed in an end-cap 32, as shown in phantom in FIG. 1, or other feature of running board 12 to minimize the environmental effects on light source 22'.

Figure 3:
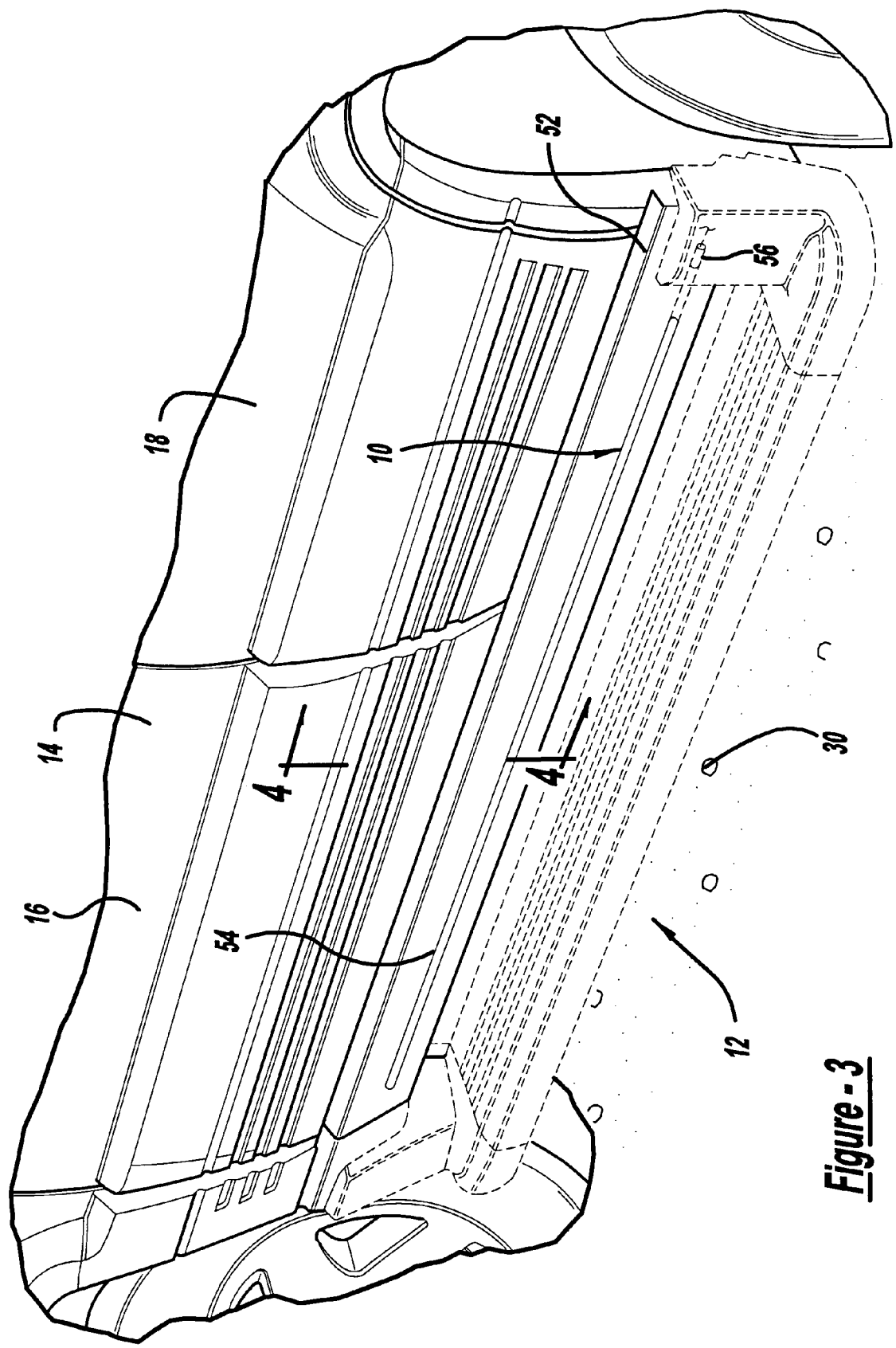
FIG. 3 is a perspective view of the lighting assembly of the present invention attached to a rocker panel of a vehicle with an optional running board shown in phantom.

Referring to FIG. 3, a lighting assembly 50 in accordance with a second embodiment of the present invention is shown attached to a rocker panel 52 of vehicle 14. Lighting assembly 50 is adaptable to be attached to a variety of different vehicles including trucks and vans, among others. Lighting assembly 50 is designed to extend longitudinally along rocker panel 52 from generally the front of front door 16 to either the end of front door 16 (two-door vehicles) or the rear of rear door 18 (four-door vehicles). It is anticipated that lighting assembly 50 can extend the entire length of rocker panel 52 or may be coupled with other lighting assemblies for varying aesthetic effects.

Figure 4:
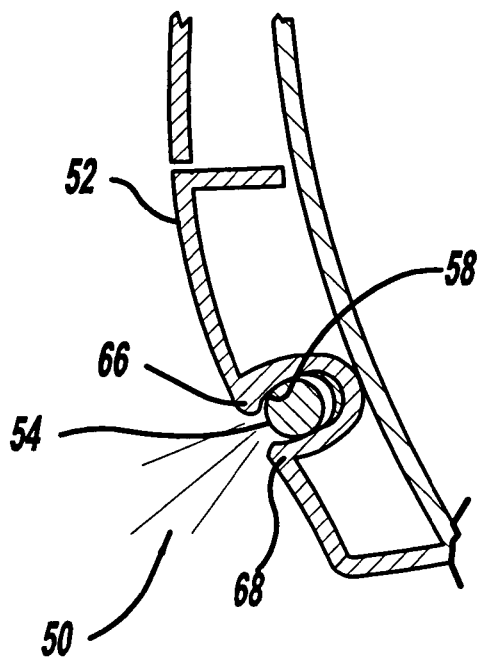
FIG. 4 is a partial cross-sectional view taken along line 4—4 of FIG. 3.
Figure 5:
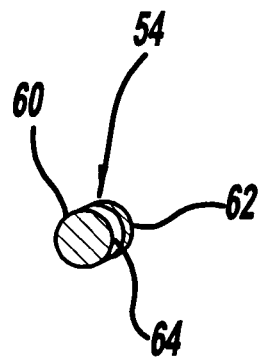
FIG. 5 is a cross-sectional view of the light tube shown in FIGS. 3 and 4.

Still referring to FIG. 3, lighting assembly 50 includes a light tube or pipe 54 and at least one light source 56. As best seen in FIGS. 4 and 5, light pipe 54 is preferably oval shaped to provide improved orientation of light pipe 54 within a cavity 58 of rocker panel 52. Light pipe 54 preferably includes a semi-flexible, central acrylic portion 60 having a white, reflective portion 62 extruded to one side of central acrylic portion 60. Light pipe 54 further includes a central hollow portion 64 disposed between central acrylic portion 60 and reflective portion 62. Central hollow portion 64 is believed to improve the uniformity of projected light from light pipe 54.

However, it is also anticipated that central acrylic portion 60 maybe made of soft acrylic material, hard acrylic material, fiber-optic material, or any material possessing favorable light transmitting properties.

Referring now to FIGS. 3 and 4, rocker panel 52 includes cavity 58 preferably having an oval cross-section to closely conform to the cross-section of light pipe 54. Rocker panel 52 is fastened below doors 16, 18 using conventional methods known in the art. Cavity 58 further includes retaining lips 66, 68 to retaining light pipe 54 within cavity 58. Light pipe 54 is installed within cavity 58 by sliding light pipe 54 from an opening (not shown) on an end of rocker panel 52.

Light source 56 of light assembly is preferably a single incandescent bulb disposed at an end of light pipe 54. However, other common light sources, such as light emitting diodes (LED) or halogen bulbs, may be used. Referring to FIG. 3, light source 56 is installed at an end of light pipe 54 such that light source 56 is in communication with a central acrylic portion 60 of light pipe 54. Central acrylic portion 60 carries the light and reflects it from cavity 58. Reflective portion 62 of light pipe 54 further reflects being projected rearwardly out of cavity 58 for improved brightness of light assembly 50.

Using this alternative method, various advantages are realized in addition to those advantages described above. Lighting assembly 50 may be installed on vehicles which are not equipped with running boards to provide ground lighting beneath the vehicle. Alternatively, lighting assembly 50 may also be installed on vehicles equipped with running boards 12 to provide step lighting along the boards. If running boards 12 are equipped on a vehicle, then light source 56 may be tapped to provide light along the ground 30 below the running board 12 by supplying light to light tube 20 positioned below running board 12, as shown as Option B in FIGS. 1 (hidden) and 2 (in phantom). The lighting of the ground in this manner allows for improved safety and aesthetic value.

It is anticipated that light assembly 50 may be fastened to rocker panel 52 before rocker panel 52 is attached to vehicle 14.

It is also anticipated that running board light assembly 10 and lighting assembly 50 may be used in various applications, such as to illuminate rear bumper steps, trailer platforms, or similar stepping surfaces.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lighting assembly for a vehicle having a rocker panel, said lighting assembly comprising:

a light pipe extending along and secured to the vehicle;

a light source coupled to said light pipe, said light source emitting light into said light pipe, said light pipe directing said light directly and substantially uniformly below the vehicle; and a cavity disposed within and extending along said rocker panel for receiving said light pipe.

2. The lighting assembly according to claim 1 wherein said light source is chosen from the group consisting of an incandescent bulb and a halogen bulb.

3. The lighting assembly according to claim 1 wherein said light source includes a light emitting diode (LED).

4. The lighting assembly according to claim 1 wherein said light pipe is a hard acrylic light pipe.

5. The lighting assembly according to claim 1 wherein said light pipe is a soft acrylic light pipe.

6. The lighting assembly according to claim 1 wherein said light pipe is a fiber-optic light pipe.

7. A lighting assembly for a vehicle having a rocker panel, said lighting assembly comprising:

a light pipe extending along and secured to the rocker panel of the vehicle;

a light source coupled to said light pipe, said light source emitting light into said light pipe, said light pipe directing said light directly and substantially uniformly below the vehicle; and a cavity disposed within and extending along said rocker panel for receiving said light pipe.

8. The lighting assembly according to claim 7 wherein said light source is chosen from the group consisting of an incandescent bulb and a halogen bulb.

9. The lighting assembly according to claim 7 wherein said light source includes a light emitting diode (LED).

10. The lighting assembly according to claim 7 wherein said light pipe is chosen from the group consisting of a hard acrylic light pipe and a soft acrylic light pipe.

11. The lighting assembly according to claim 7 wherein said light pipe is a soft acrylic light pipe.

12. The lighting assembly according to claim 7 wherein said light pipe is a fiber-optic light pipe.

13. A light assembly for a vehicle, said assembly comprising:
   a rocker panel fixedly secured to the vehicle;
   a cavity disposed within and extending along said rocker panel;
   a first light tube disposed within said cavity; and
   a light source coupled to said light tube, said light source emitting light into said light tube, said light tube directing said light directly and substantially uniformly from said cavity.

14. The light assembly according to claim 13, further comprising:
   a running board coupled to said vehicle below said rocker panel, said first light tube directing said light directly and substantially uniformly onto said running board.

15. The light assembly according to claim 14 further comprising a second light tube coupled with said light source, said second light tube directing a portion of said light directly and substantially uniformly over a ground surface below said running board.

16. The light assembly according to claim 13 wherein said light source is chosen from the group consisting of an incandescent bulb, a halogen bulb, and a light emitting diode (LED).

17. The lighting assembly according to claim 13 wherein said first light tube is chosen from the group consisting of a hard acrylic light and a soft acrylic light tube.

* * * * *